Patented Oct. 26, 1926.

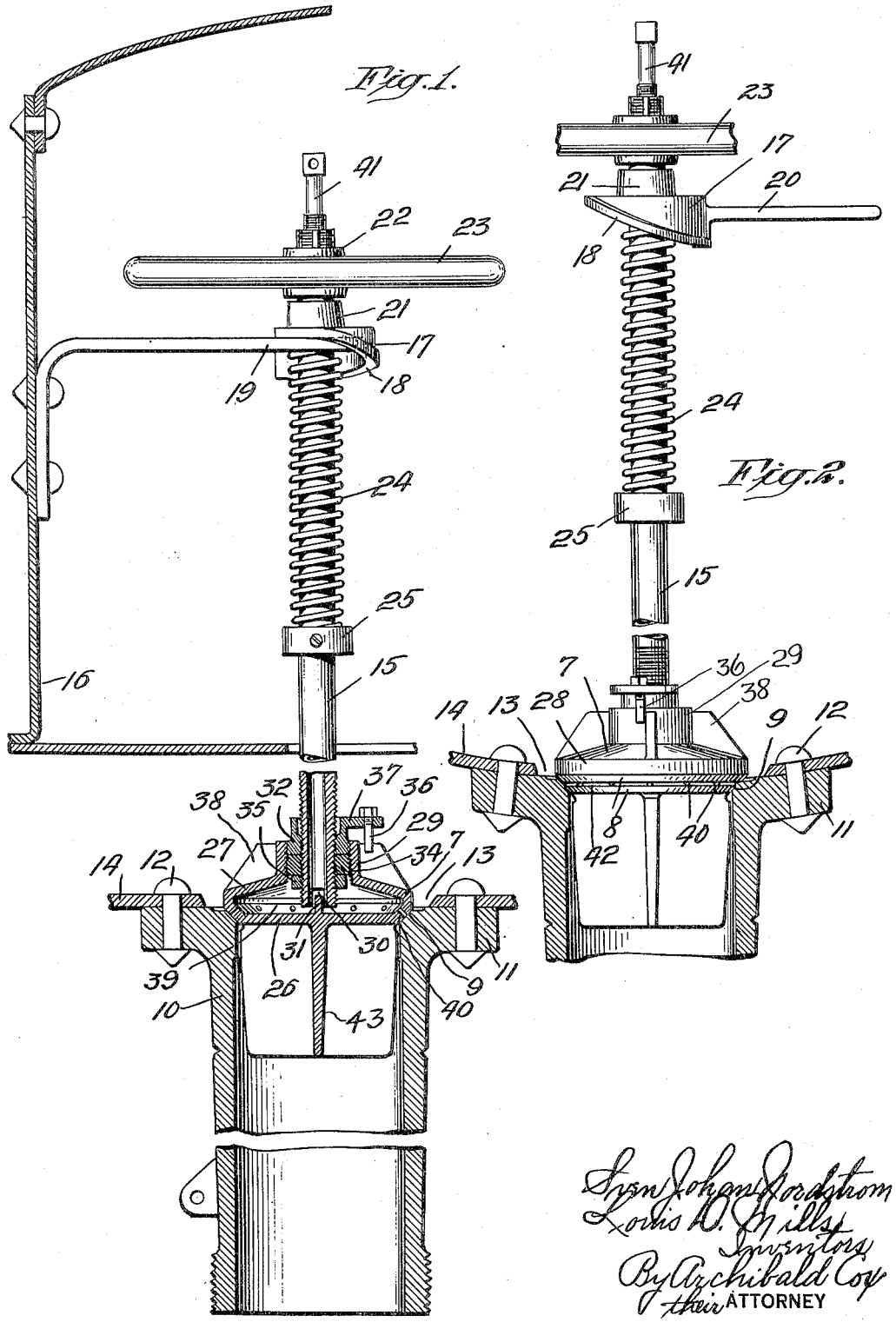

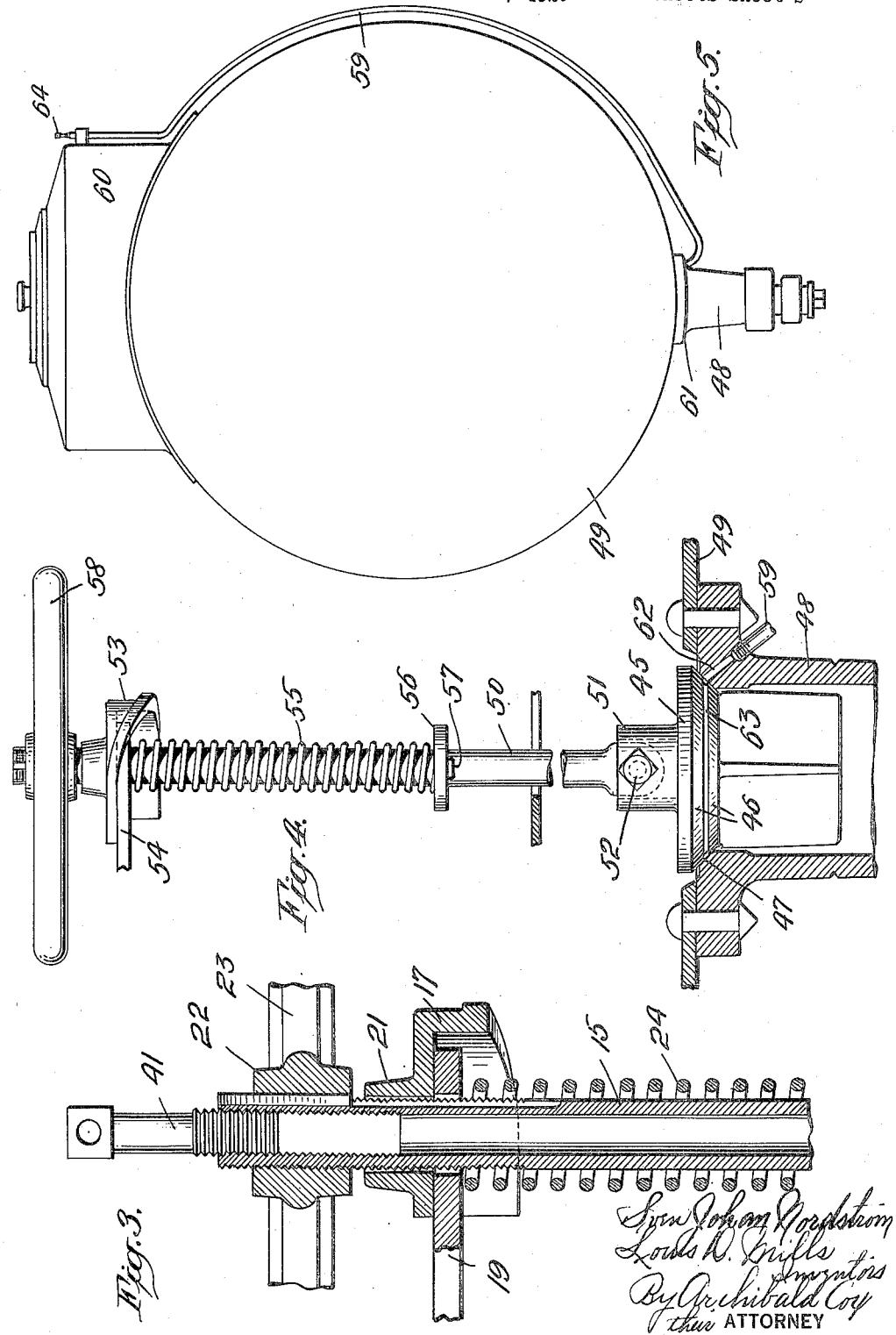

1,604,944

UNITED STATES PATENT OFFICE.

SVEN JOHAN NORDSTROM, OF SARATOGA, AND LOUIS D. MILLS, OF PALO ALTO, CALIFORNIA, ASSIGNORS TO MERCO NORDSTROM VALVE COMPANY, OF SAN FRANCISCO, CALIFORNIA, A CORPORATION OF DELAWARE.

METHOD OF REGRINDING VALVES.

Application filed December 12, 1925. Serial No. 74,998.

The invention relates to a method of regrinding valves, and more particularly to a method of regrinding valves while they are in closed position and subjected to the pressure of the fluid or liquid in the line or other space which the valves control.

The present invention has to do particularly with valves of the type comprising an annular valve seat, usually beveled, against which the movable member or plug is adapted to be seated. When valves of this type have developed a leak it has heretofore been necessary to shut off at the source the fluid or liquid passing through the valve and then dismantle the valve so that the bearing surfaces may be reground or lapped to make a tight joint between the plug and its seat. This procedure has necessarily been expensive, necessitating as it does putting the line of pipe, or the tank or other space controlled by the valve, out of commission for a longer or shorter period. The object of the present invention is to produce a method of regrinding or lapping valves while they are in use so as to effectually prevent leakage, without the necessity of dismantling the valves and regrinding or lapping in the manner heretofore practiced.

The method of the present invention may be practiced in connection with many different kinds of valves of the above specified type consisting of an annular valve seat and a movable member or plug. For the purpose of explaining the principle of the invention, however, and illustrating its use, the invention is described herein as applied to the regrinding or lapping of tank car valves while the valves are in closed position and subjected to the pressure of the liquid in the tank. Such valves are typical of valves comprising an annular valve seat and a plug. It will be understood therefore that the invention is not to be restricted to the regrinding of tank car valves but is equally applicable to the regrinding of other kinds of valves of this type.

In the accompanying drawings illustrating the practice of the invention in connection with valves for tank cars and the like, Fig. 1 is a longitudinal section through the tank car valve, and showing the valve operating means in side elevation; Fig. 2 is a side elevation of the movable member or plug of the valve, with the valve seat shown in transverse section; Fig. 3 is an enlarged longitudinal section through the upper end of the means for operating the valve; Fig. 4 is a side elevation, partly in section, of a different form of tank valve, to illustrate a different means of supplying the bearing surfaces with the grinding mixture; and Fig. 5 is a diagrammatic view of a tank employing the valve shown in Fig. 4.

The valve illustrated in Figs. 1 and 2 is a flattened plug 7 provided on its under side with the beveled bearing or seating surface 8 adapted to seat against the annular seat 9 formed in the upper end of an outlet pipe 10 provided with the circumferential flange 11 which is secured by the rivets 12 to the edge of a hole 13 formed in the bottom 14 of the tank, which may be of any usual construction. A valve stem 15, connected at its lower end with the plug 7, extends upwardly through the tank and into the dome 16 at the top thereof. On the upper end of the valve stem 15 is loosely mounted a cam member 17, the cam surface 18 of which is adapted to travel up on the inner end of a bracket 19 secured to the side wall of the dome 16. When the handle 20 of the cam member 17 is turned in a clockwise direction, the cam surface 18 rides up on the bracket 19, thereby forcing the hub portion 21 of the cam member against the hub 22 of a wheel-handle 23, threaded onto the upper extremity of the valve stem 15, thereby lifting the plug 7 from its seat. When the handle 20 is turned in the reverse direction, the plug 7 is seated by gravity aided by the action of a spring 24, the upper end of which takes against the under surface of the bracket 19 and the lower end of which engages a collar 25 adjustably secured to the valve stem 15. The above described parts operate as usual.

The plug 7 is a hollow structure consisting of a disk-like bottom 26 and a flattened cone-shaped top 27, the sides and lower edge of the plug being formed by the cylindrical portion 28 and the beveled seating surface 8. The plug 7 is guided in its vertical movements within the upper part of the pipe 10 by means of the webs or ribs 43 depending from the under surface of the bottom part 26 of the plug. The center of the flattened cone-shaped top 27 of the plug extends upwardly as a circular flange 29.

The lower end of the valve stem 15 has a loose connection with the plug 7 so that in case the stem 15 is deflected or bent by the movement of heavy fluids within the tank or is moved by the spring or deflection of the tank shell, the plug 7 is not shifted against its seat:—In the lower extremity of the stem 15 is formed a transverse slot 30 which loosely embraces the lip 31 extending across the upper surface of the bottom 26 of the plug. The lower end of the stem 15 is threaded externally to receive loosely a gland 32 which is also threaded externally to screw loosely into the circular flange part 29 of the plug 7. Leakage from the interior of the plug past the gland is prevented by the packing 34 which is forced against the under side of the gland by a nut 35 threaded onto the lower extremity of the stem 15. The gland 32 is prevented from turning by the engagement of a pin 36, loosely received in an arm 37 extending from the gland, with one of the wings 38 projecting radially from the upper surface of the top 27 of the plug and from the outer surface of the flange 29. By lifting the pin 36 and turning the gland 32 in the proper direction a greater or less force will be exerted on the packing 34. This connection between the lower end of the stem 15 and the plug 7 compensates for any deflection of the valve stem and is tight enough to prevent the escape of lubricating or grinding substance upwardly from the interior of the plug past the screw threads.

To regrind the bearing or seating surface between the plug 7 and the valve seat 9 in the casing 10 while the plug is in closed condition and subjected to the pressure of the liquid in the tank, a suitable grinding mixture, consisting of lubricant and emery or carborundum, is introduced into the chamber 39 formed in the plug 7 and is then forced out through the holes 40 extending from the chamber 39 to the bearing surface 8. For this purpose the valve stem 15 is a hollow member the upper end of which is closed by the screw 41. By filling the stem 15 with the grinding mixture and then turning the screw 41 in a clockwise direction the grinding mixture is put under pressure and is forced out through the lower end of the stem into the chamber 39 and out through the holes 40.

By turning the handle 23 the plug 7 is rotated against its seat thereby regrinding the bearing surfaces and effecting a tight joint between them. An annular groove 42 in the bearing surface 8 aids in the distribution of the grinding mixture over the contacting valve surfaces. When the screw 41 is turned so as to force the grinding mixture out through the holes 40 the vertical component of the force thereby created lifts the plug 7 slightly from its seat. Thus when the handle 23 is turned the grinding mixture is properly smeared over the bearing surfaces, so that the regrinding of the joint may be expeditiously effected. When the handle 23 is turned to rotate the plug 7 against its seat the cam member 17 is held against turning by the bracket 19, in the position shown in Fig. 1, so that the plug is not lifted from its seat.

In the form of the valve shown in Figs. 4 and 5 the plug 45 is a flattened disk-like member provided on its under side with the beveled bearing surface 46 adapted to seat against the annular, beveled valve seat 47 formed in the upper end of the pipe 48 secured to the bottom of the tank 49. The lower end of the valve stem 50 fits loosely into the central boss 51 extending upwardly from the plug 45 and is secured thereto by the pin and nut 52. The plug 45 is manipulated in exactly the same manner as the plug 7 and for this purpose is provided with the cam member 53 which engages with the bracket 54. The spring 55 corresponds to the spring 24 and is held in place by the collar 56 and pin 57. On the upper end of the valve stem 50 is mounted a wheel-handle 58 by turning which the plug 45 is rotated against the valve seat 47 without being lifted therefrom.

In this form of valve the plug and stem are solid. To introduce the grinding mixture between the bearing surfaces of the plug 45 and its seat 47 we provide a pipe 59 extending from the exterior of the dome 60 at the top of the tank 49 down around one side of the tank to the flange part 61 of the pipe 48, as shown in Fig. 5. The pipe 59 enters an oblique hole 62 the inner end of which opens into the valve seat 47. In order that there may be a more effective distribution of the grinding mixture the bearing surface of the plug 45 is provided with the annular groove 63. By filling the pipe 59 with the grinding mixture and then turning down on the screw 64, the grinding mixture is forced out through the hole 62, so that when the wheel-handle 58 is rotated the bearing surfaces between the plug 45 and its valve seat 47 are reground and a tight joint thereby effected.

From the foregoing description it will be understood by those skilled in the art that the present invention provides means whereby valves may be effectively reground while they are in service and subjected to the pressure of the fluid or liquid in the pipe line, tank or other space controlled by the valve. By thus obviating the necessity of shutting off the fluid or liquid at its source and then dismantling the valve a considerable saving is secured in time and labor. Moreover, by using a grinding mixture consisting of a proper kind of lubricant and a suitable abrasive the grinding mixture may be used as a seal whenever the movable member is turned to closed position, simply by turning down on the screw which puts the grinding mixture under pressure to force the latter into the joint between the movable member and the valve seat.

Having thus described the invention what we claim as new is:—

1. The method of regrinding or lapping the seating surfaces of valves for tank cars and the like without disassembling, which consists in introducing an abrasive mixture to an intermediate portion of the plane of contact between the movable member and the valve seat through a conduit from a point outside of the content engaging portion of the enclosure controlled by the valve, and rotating the movable member against the valve seat.

2. The method of regrinding or lapping the seating surfaces of valves for tank cars and the like, which consists in forcing an abrasive mixture under pressure through a conduit from a point outside of the content engaging portion of the tank to and between the movable member and the valve seat, thereby lifting the movable member slightly from its seat, and then rotating the movable member against the valve seat without otherwise lifting it therefrom.

3. The method of regrinding or lapping valves, which consists in forcing an abrasive mixture through a conduit leading from a point outside the content engaging portion of the enclosure controlled by the valve to and between the movable member of the valve and the valve seat to separate the movable member slightly from the valve seat without permitting leakage between them, and then rotating the movable member against the valve seat.

4. The method of regrinding or lapping the seating surfaces of valves while in closed condition in which the movable member of the valve is subjected to the pressure of the fluid it prevents from passing through the valve casing, which consists in simultaneously lifting the movable member slightly from its seat and introducing an abrasive mixture into the opening through a conduit leading from a point outside of the enclosure controlled by the valve to an intermediate portion of the plane of contact between the movable member and the valve seat, thereby preventing leakage between the movable member and the valve seat, and rotating the movable member against the valve seat without otherwise lifting it therefrom.

5. The method of regrinding or lapping the seating surfaces of valves while in closed condition and the movable member of the valve is subjected to the pressure of the fluid it prevents from passing through the valve casing, which consists in forcing a mixture of lubricant and a granular abrasive substance between the movable member and the valve seat through a conduit leading from a point outside of the enclosure controlled by the valve to an intermediate portion of the plane of contact between the movable member and the valve seat, thereby preventing the fluid from passing between the movable member and the valve seat, and rotating the movable member against the valve seat.

SVEN JOHAN NORDSTROM.
LOUIS D. MILLS.